United States Patent [19]
Onogi et al.
[11] Patent Number: 4,840,834
[45] Date of Patent: Jun. 20, 1989

[54] ELECTROSTATIC RECORDING MATERIAL

[75] Inventors: Yasuharu Onogi; Akinori Oka; Masakatsu Nagatomo; Takumi Kondo; Kouji Mizumoto, all of Miyazaki, Japan

[73] Assignee: Oji Paper Co., Ltd., Tokyo, Japan

[21] Appl. No.: 27,818

[22] Filed: Mar. 19, 1987

[30] Foreign Application Priority Data

Mar. 19, 1986 [JP] Japan ................................ 61-61177

[51] Int. Cl.[4] ........................................... B32B 9/00

[52] U.S. Cl. ................................. 428/211; 428/323; 428/328; 428/511; 428/512; 428/513; 428/514; 428/329; 428/403; 428/405; 427/121; 162/138; 346/135.1

[58] Field of Search ..................... 162/138; 346/135.1; 427/121; 428/211, 511, 512, 513, 514, 537, 323, 328, 329, 403, 405

[56] References Cited

U.S. PATENT DOCUMENTS

| | | | |
|---|---|---|---|
| 3,944,705 | 3/1976 | Fujioka et al. | 427/121 |
| 4,250,228 | 2/1981 | Fujioka | 428/521 |
| 4,349,611 | 9/1982 | Miyakawa et al. | 428/524 |
| 4,444,847 | 4/1984 | Fujioka et al. | 428/522 |
| 4,447,487 | 5/1984 | Maekawa et al. | 346/200 |
| 4,460,671 | 7/1984 | Yasuda et al. | 428/328 |
| 4,567,497 | 1/1986 | Tamagawa et al. | 427/150 |
| 4,682,191 | 7/1987 | Tamagawa et al. | 427/150 |

FOREIGN PATENT DOCUMENTS

| | | |
|---|---|---|
| 1460597 | 1/1977 | United Kingdom . |
| 1468437 | 3/1977 | United Kingdom . |

*Primary Examiner*—Ellis P. Robinson
*Assistant Examiner*—P. J. Ryan
*Attorney, Agent, or Firm*—Wenderoth, Lind & Ponack

[57] ABSTRACT

An electrostatic recording material which comprises a support coated in sequence with a conductive layer and a recording layer composed of a dielectric resin and a pigment, wherein at least a part of the pigment component in said recording layer is made of an aluminum hydroxide powder having an average particle size of 1–20 μm is disclosed.

3 Claims, No Drawings

ELECTROSTATIC RECORDING MATERIAL

BACKGROUND OF THE INVENTION

The present invention relates to an electrostatic recording material for use in facsimiles printer and plotters. More particularly, the present invention relates to an electrostatic recording material useful in those facsimiles and plotters which are designed to operate at high speeds with pulse widths ranging from several to several tens of microseconds and which are capable of high resolution of at least 16 lines per millimeter.

The electrostatic recording material consists of an electrically conductive support coated with a recording layer that is formed of a dielectric resin and a pigment. An electrostatic latent image formed by applying voltage to the surface of the recording layer or to both sides of the recording material is developed with a toner which is either in the form of a pigmented powder or a liquid developer. The toner image is then fixed for record production by a suitable means such as the application of heat or pressure or by drying.

With the recent advances in electrostatic recording systems capable of high speed operation at high resolution, production of higher-quality records has been required. One important problem that has remained unsolved is reduced number of dot dropouts that occurs as a result of instable corona-discharge from multi-stylus of electrode. This problem is particularly pronounced with multi-stylus electrostatic recording machines intended for high speed operation at high resolution. It is difficult for a voltage of short pulse width to be accumulated on the styli in the necessary amount to initiate discharging. In addition, the surface areas of the styli in the printhead adapted for high resolution are so small as to reduce the number of areas where voltage concentration occurs and the decreased probability of discharging leads to an increased chance of dot-dropout (i.e., many dots remain unrecorded).

It has been common practice to use pigments in combination with dielectric resins in order to provide gap spaces between the recording layer of an electrostatic recording material and the printhead. Various pigments, both inorganic and organic, have been used or proposed; inorganic pigments include calcium carbonate, talc, titanium dioxide, calcined clay and aluminum oxide, and organics include plastic pigments, starches and fine cellulose powders. However, the use of these pigments has not provided a complete solution to the problem of dot-dropouts. It has therefore been desired to develop an electrostatic recording material that is capable of recording at high resolution and which is substantially free from the problem of dot-dropouts even if it is used with a matrix of styli having an extremely small diameter at their tip.

SUMMARY OF THE INVENTION

The present invention has been accomplished in order to meet this long-felt need. An object, therfore, of the present invention is to provide an electrostatic recording material that can be used with an array of styli having a tip diameter of about 40 $\mu m$ without causing a substantial problem of dot-dropouts and which thereby makes most of the advantages of high-speed recording at high resolution.

This object of the present invention can be achieved by an electrostatic recording material that comprises a support coated in sequence with a conductive layer and a recording layer composed of a dielectric resin and a pigment, wherein at least a part of the pigment component in the recording layer is made of an aluminum hydroxide powder having an average particle size within the range of 1–20 $\mu m$.

DETAILED DESCRIPTION OF THE INVENTION

In accordance with the present invention, an aluminum hydroxide powder is incorporated in the recording layer and this enables electrostatic recording to be effected with the number of dot-dropouts being reduced to a negligible level. In the prior art, it has been difficult to reduce the number of dot-dropouts to less than about 100 count/m. However, the recording material of the present invention is capable of producing a record of extremely high quality with the number of dot-dropouts being reduced to a practically negligible level of no more than 10 count/m.

As already mentioned, various inorganic pigments have been proposed for use in the recording layer of an electrostatic recording material together with dielectric resins and they include calcium carbonate, talc and titanium dioxide. Besides these pigments, aluminum oxide has also been proposed (see Japanese Patent Public Disclosure No. 63018/1978). However, the use of aluminum oxide has been little effective for the purpose of producing a desired dot pattern by reducing the number of dot-dropouts.

In place of aluminum oxide, the present invention uses aluminum hydroxide in the recording layer. This compound has the chemical formula $Al_2O_3.3H_2O$ or $Al(OH)_3$. It was quite surprising that the number of dot-dropouts could be significantly reduced by incorporating aluminum hydroxide in the recording. Aluminum hydroxide and aluminum oxide are entirely different compounds having quite dissimilar properties, as shown in the following table:

| | Aluminum hydroxide $Al(OH)_3$ or $Al_2O_3.3H_2O$ | Aluminum oxide $Al_2O_3$ |
|---|---|---|
| mineral | gibbsite | corundum |
| crystal system | monoclinic | hexagonal |
| true specific gravity | 2.42 | 3.98 |
| Mohs hardness | 3 | 12 |
| refractive index | 1.57 | 1.76 |
| specific heat (cal/g. °C.) | 0.29 | 0.18 |

The electrical properties of the two compounds are also different and it is assumed that aluminum hydroxide having a lower electrical resistance than aluminum oxide allows for easier discharging by pin electrodes to realize the effect of reducing the number of dot-dropouts.

A successful electrostatic recording system requires an appropriate gap to be present between the recording layer and printhead. To meet this requirement, the aluminum hydroxide powder used in the present invention must have an average particle size within the range of 1–20 $\mu m$. If the average particle size of the aluminum hydroxide powder is less than 1 $\mu m$, so small gap spaces are provided between the recording layer and the printhead that nonuniformity will occur in the solid printed areas to cause reduced recording densities. If the average particle size of the aluminum hydroxide powder is more than 20 $\mu m$, the gap spaces between the recording layer and the printhead are too large to ensure uniform recording. Therefore, in order to produce a record of the desired quality, the average particle size of the aluminum hydroxide powder must be within the range of 1–20 μm. aluminum hydroxide having an average particle size of no more than 1 μm has conventionally been used as a pigment to impart increased whiteness to art paper and other coated papers. The use of aluminum hydroxide having an average particle size of 20 82 m or more has also been known and this is chiefly intended for use as a pigment to be incorporated in the interior of wood-free paper. However, for the reasons stated above, these excessively small and large aluminum hydroxide particles are not suitable for use in the present invention.

The surfaces of the particles of aluminum hydroxide may be treated by any appropriate technique so as to improve the dispersibility of these particles in rubber or plastics or the miscibility of aluminum hydroxide with them. For instance, aluminum hydroxide particles the surface of which have been treated with an aliphatic acid or a titanium- or silane-based coupling agent are effective for achieving a satisfactory reduction in the number of dot-dropouts and hence are included within the scope of the present invention.

In the present invention, an aluminum hydroxide powder may be used in combination with an inorganic pigment such as calcium carbonate, talc, clay or titanium dioxide or an organic pigment such as a plastic pigment or starch. In this case, at least 2% of the total weight of the pigments in the recording layer must be occupied by aluminum hydroxide. If the content of aluminum hydroxide in the pigment component of the recording layer is less than 2% by weight, the number of dot-dropouts will increase to an undesirably high level. If aluminum hydroxide is used in combination with other pigments, the average particle size of the former is preferably larger than that of the latter in order to ensure a significant reduction in the number of dot-dropouts.

The dielectric resin that can be used in the recording layer is not limited to any particular type and acrylic resins, polyesters, vinyl chloride/vinyl acetate copolymers, butyral resins, and other appropriate dielectric resins may be used either alone or in admixture.

It is advantageous for the purposes of the present invention that the ratio of the dielectric resin to pigment (R/P ratio) in the recording layer is within the range of 5:5 to 8:2. If the R/P ratio is not within this range, various disadvantages will occur such as a reduced recording density, an excessively high gloss on the recording layer, and the loss of natural appearance or writability from the electrostatic recording material.

The support of the electrostatic recording material of the present invention may be formed of any material that has been used in the field of electrostatic recording; illustrative examples include papers such as wood-free paper, machine glazed (MG) paper, glassine paper and transparent paper, as well as plastic films (e.g. PET film), synthetic polyolefin paper, and metal foils.

A conductive layer is formed on the support from a variety of materials including high-molecular weight electrolytes (e.g. cationic high-molecular weight electrolytes such as polyvinylbenzyl trimethyl chloride and polyallyltrimethyl ammonium chloride; and anionic high-molecular weight electrolytes such as polystyrenesulfonic acid salts and polyacrylic acid salts) and materials such as ZnO and $SnO_2$ that owe their electrical conductivity to a predominance of negative electrons. The conductive layer may be formed of any material that has the electrical conductivity necessary for rendering said layer suitable for use in electrostatic recording material.

The following examples and comparative examples are provided for the purpose of further illustrating the present invention but are in sense to be taken as limiting. The performance of the electrostatic recording materials prepared in these examples and comparative examples was evaluated with an electrostatic plotter, EP-2100 of Seiko Instruments & Electronics, Ltd., that is applied voltage by face-side control method, adn which featured a line density of 16/mm. The results of this evaluation are shown in Table 1. The particle size of an aluminum hydroxide powder was measured with a particle size distribution analyzer, CP-3 of Shimadzu Seisakusho, Ltd., that depended on centrifugal precipitation for its operation.

EXAMPLE 1

Vinyl chloride/vinyl acetate copolymer 100 (parts by (LCN of Kanegafuchi Chemical Industry weight) Co., Ltd.; 37% solids):

Aluminum hydroxide powder 30 (particle size; 8.0 μm):

Toluene: 100

The above-listed components were mixed with a paint conditioner to prepare a paint for the formation of a recording layer. In a separate step, a sheet of wood-free paper (50 g/m$^2$) was coated with polyvinylbenzyl trimethyl ammonium chloride (CS-6300H of Sanyo Chemical Industries Co., Ltd.) for a coating weight of 5.0 g/m$^2$ so as to make a conductive support. This support was coated with the previously prepared paint for a coating weight of 5.0 g/m$^2$ so as to prepare an electrostatic recording material.

COMPARATIVE EXAMPLE 1

Vinyl chloride/vinyl acetate copolymer 100 (parts by (LCN of Kanegafuchi Chemical Industry weight) Co., Ltd.; 375 solids):

Calcium carbonate powder (NS-100 of 30 Nitto Funka Kogyo K.K.; average particle size; 2.1 μm):

Toluene: 100

These components were mixed together to make a paint for the formation of a recording layer. A conductive support that was prepared as in Example 1 was coated with the paint as in Example 1 so as to prepare an electrostatic recording material.

COMPARATIVE EXAMPLE 2

Vinyl chloride/vinyl acetae copolymer 100 (parts by (LCN of Kanegafuchi Chemical Industry weight) Co., Ltd.; 37% solids):

Aluminum oxide: 30

Toluene: 100

These components were mixed together to make a paint for the formation of a recording layer. A conductive support that was prepared as in Example 1 was coated with the paint as in Example 1 so as to prepare an electrostatic recording material.

As will be clear from the data shown in Table 1, the recording material prepared in Example 1 using aluminum hydroxide as a pigment in the recording layer was superior to the samples prepared in Comparative Examples 1 and 2 using calcium carbonate and aluminum oxide, respectively, in that the number of dot-dropouts could be appreciably reduced. the aluminum oxide used in the sample of Comparative Example 2 was not only ineffective for the purpose of reducing the number of dot-dropouts but also harmful to the printhead because the particles of aluminum oxide were so hard as to cause rapid wear of the printhead. It was therefore clear that aluminum oxide is not suitable for use as a pigment in the recording layer of an electrostatic recording material.

EXAMPLE 2

This example was intended to show that an aluminum hydroxide powder was also effective even when its particles were subjected to surface treatment.

Vinyl chloride/vinyl acetate copolymer 100 (parts by (LCN of Kanegafuchi Chemical Industry weight) Co., Ltd.; 37% solids):

Aluminum hydroxide powder (8.0 μm 30 particles treated with stearic acid:

Toluene: 100

These components were mixed to prepare a paint for the formation of a recording layer. A conductive support that was prepared as in Example 1 was coated with the paint as in Example 1 so as to prepare an electrostatic recording material. As shown in Table 1, this recording material produced recording performance that was as satisfactory as the sample of Example 1 in terms of the number of dotdropouts. Equally good results were attained when the surfaces of the particles of aluminum hydroxide were treated with a titanium- or silane-based coupling agent instead of an aliphatic acid such as stearic acid.

COMPARATIVE EXAMPLE 3

Vinyl chloride/vinyl acetate copolymer 100 (parts by (LCN of Kanegafuchi Chemical Industry weight) Co., Ltd.; 37% solids):

Aluminum hydroxide powder 30 (average particle size; 0.6 μm):

Toluene: 100

These components were mixed together to make a paint for the formation of a recording layer. A conductive support that was prepared as in Example 1 was coated with the paint as in Example 1 to prepare an electrostatic recording material.

COMPARATIVE EXAMPLE 4

Vinyl chloride/vinyl acetate copolymer 100 (parts by (LCN of Kanegafuchi Chemical Industry weight) Co., Ltd.; 375 solids):

Aluminum hydroxide powder 30 (average particle size; 25 μm):

Toluene 100

These components were mixed together to make a paint for the formation of a recording layer. A conductive support that was prepared as in Example 1 was coated with the paint as in Example 1 to prepare an electrostatic recording material.

As is clear from Table 1, the electrostatic recording material of Comparative Example 3 which employed an aluminum hydroxide powder having an average particle size of less than 1 μm created so small gap spaces between the recording layer and the printhead that nonuniformity occurred in the solid printed areas to give reduced recording densities as compared with the samples prepared in Examples 1 and 2. The sample prepared in Comparative Example 4 using an aluminum hydroxide powder whose average particle size exceeded 20 μm was also incapable of producing a uniform record because excessively large gap spaces were formed between the recording layer and the printhead.

EXAMPLE 3

Vinyl chloride/vinyl acetate copolymer 100 (parts by (LCN of Kanegafuchi Chemical Industry weight) Co., Ltd.; 37% solids):

Aluminum hydroxide powder 30 (average particle size; 17.0 μm):

Toluene: 100

These components were mixed together to make a paint for the formation of a recording layer. A conductive support that was prepared as in Example 1 was coated with the paint as in Example 1 to prepare an electrostatic recording material.

The sample prepared in Example 3 was superior to that of Comparative Example 4 in terms of uniformity in the solid printed areas and the ability to reduce the number of dotdropouts. Therefore, the upper limit for the average particle size of the aluminum hydroxide powder used in the present inventio is 20 μm.

EXAMPLE 4

Acrylic resin (Himer SBA-720 of Sanyo 100 (parts by Chemical Industries Co., Ltd.; 45% solids): weight)

Aluminum hydroxide powder 45 (particle size; 8.0 μm):

Toluene: 155

These components were mixed together with a paint conditioner to prepare a paint for the formation of a recording layer. In a separate step, a sheet of wood-free paper (50 g/cm) was coated with a high-molecular weight electrolyte (CS-6300H of Sanyo Chemical Industries Co., Ltd.) for coating weight of 5.0 g/m$^2$ so as to make a conductive support. This support was coated with the previously prepared paint to make an electrostatic recording material.

EXAMPLE 5

Acrylic resin (Himer SBA-720 of Sanyo 100 (parts by Chemical Industries Co., Ltd.; 45% solids): weight)

Aluminum hydroxide powder 12 (particle size; 8.0 μm):

Toluene: 78

These components were mixed together to make a paint for the formation of a recording layer. A conductive support that was prepared as in Example 4 was coated with the paint as in Example 4 to prepare an electrostatic recording material.

The samples prepared in Examples 4 and 5 were as satisfactory as those prepared in Examples 1 and 2 in that the number of dot-dropouts was reduced to an acceptable level. However, the sample of Example 4 had a lower recording density than those prepared in Examples 1 and 2. The sample of Example 5 had a higher surface glass on the recording layer than those prepared in Examples 1 and 2 and this sample was rather inferior as in electrostatic recording material because of the lack of natural appearance and adaptability for writing with a pencil. In view of this fact, the ratio of dielectric resin to pigment (R/P ratio) in the recording layer is preferably within the limits shown in Example 4 (5:5) and Example 5 (8:2).

The aluminum hydroxide powder specified by the present invention is effective for reducing the number of dot-dropouts not only when it is used in the recording layer as the sole pigment but also when it is combined with another pigment, as shown below in Examples 6 and 7.

EXAMPLE 6

Acrylic resin (Himer SBA-720 of Sanyo Chemical Industries Co., Ltd.; 45% solids): 100 (parts by weight)

Aluminum hydroxide powder (particle size; 8.0 μm): 0.6

Calcium carbonate (NS-400 of Nitto Funka Kogyo K.K.): 29.4

Toluene: 120

These components were mixed together to make a paint for the formation of a recording layer. A conductive support that was prepared as in Example 4 was coated with the paint as in Example 4 to prepare an electrostatic recording material.

EXAMPLE 7

Acrylic resin (Himer SBA-720 of Sanyo Chemical Industries Co., Ltd.; 45% solids): 100 (parts by weight)

Aluminum hydroxide powder (particle size; 8.0 μm); 5

Calcium carbonate (NS-400 of Nitto Funka Kogyo K.K.): 25

Toluene: 120

These components were mixed together to make a paint for the formation of a recording layer. A conductive support that was prepared as in Example 4 was coated with the paint as in Example 4 to prepare an electrostatic recording material.

Example 6 shows the minimum content of aluminum hydroxide that is necessary to attain the advantage of the present invention when it is used in combination with another pigment. In other words, aluminum hydroxide must be present in the recording layer in an amount of at least 2% of the total weight of the pigments used in order to ensure the intended reduction in the number of dot-dropouts.

EXAMPLE 8

This example shows the case of using aluminum hydroxide in combination with an organic pigment.

Acrylic resin (Himer SBA-720 of Sanyo Chemical Industries Co., Ltd.; 45% solids): 100 (parts by weight)

Aluminum hydroxide powder (particle size; 8.0 μm): 5

Plastic pigment (product of Toshiba Silicone Co., Ltd.): 25

Toluene: 120

These components were mixed together with a pain conditioner to make a paint for the formation of a recording layer. In a separate step, a sheet of wood-free paper (50 g/m$^2$) was coated with a high-molecular weight electrolyte (CS-6300H of Sanyo Chemical Industries Co., Ltd.) for a coating weight of 5.0 g/m$^2$ so as tomake a conductive support. This support was coated with the previously prepared paint for a coating weight of 5.0 g/m$^2$ so as to prepare an electrostatic recording material.

As shown in Table 1, the advantage of the present invention was attained even when aluminum hydroxide was used in combination with an organic pigment in the recording layer.

EXAMPLE 9

Acrylic resin (Himer SBA-720 of Sanyo Chemical Industries Co., Ltd.; 45% solids): 100 (parts by weight)

Aluminum hydroxide powder (average particle size; 6.5 μm): 15

Calcium carbonate powder (NS-100 of Nitto Funka Kogyo K.K.; average particle size; 2.1 μm): 15

Toluene: 120

These components were mixed together to make a paint for the formation of a recording layer. A conductive support that was prepared as in Example 8 was coated with the paint as in Example 8 to make an electrostatic recording material.

COMPARATIVE EXAMPLE 5

Acrylic resin (Himer SBA-720 of Sanyo Chemical Industries Co., Ltd.; 45% solids): 100 (parts by weight)

Aluminum hydroxide powder (average particle size; 1.5 μm): 15

Calcium carbonate powder (NS-100 of Nitto Funka Kogyo K.K.; average particle size; 2.1 μm): 15

Toluene: 120

These components were mixed together to make a paint for the formation of a recording layer. A conductive support that was prepared as in Example 8 was coated with the paint as in Example 8 to make an electrostatic recording material.

As will become apparent by comparing the data shown in Table 1 for the samples of Example 9 and Comparative Example 5, if an aluminum hydroxide powder is used in combination with another pigment powder, the former desirably has a larger average particle size than the latter for the purpose of reducing the number of dot-dropouts.

EXAMPLE 10

Vinyl chloride/vinyl acetae copolymer (LCN of Kanegafuchi Chemical Industry Co., Ltd.; 37% solids: 100 (parts by weight)

Aluminum hydroxide powder (average particle size; 8.0 μm) 30

Toluene: 100

These components were mixed together with a paint conditioner to make a paint for the formation of a recording layer. A sheet of synthetic paper (Yupo FPG of Oji Yuka Synthetic Paper Co., Ltd.; 90 μm thick) was coated with a high-molecular weight electrolyte (CS-6300H of Sanyo Chemical Industries Co., Ltd.) for coating weight of 5.0 g/m$^2$ so as to make a conductive support. This support was coated with the previously prepared paint for a coating weight of 5.0 g/m$^2$ so as to prepare an electrostatic recording material.

As shown in Table 1, the aluminum hydroxide powder specified by the present invention was effective in reducing the number of dot-dropouts even when synthetic paper instead of paper was used as a support material.

Table 1 summarizes the results of evaluation of recording on the electrostatic recording materials prepared in Examples 1 to 10 and Comparative Examples 1 to 5. The data of the parameters listed in Table 1 were obtained as follows.

(1) Recording density

After measurement with a Macbeth densitometer RD-514, the following formula was used to calculate the recording density:

(measured density of line image) - (measured density of the white background of the recording material before recording)

(2) Fog

After measurement with a Macbeth densitometer RD-514, the following formula was used to calculate the amount of fog:

(measured fog in non-image area) - (measured fog in the white background of the recording material before recording)

(3) Number of dot-dropouts

Line images with each line consisting of 2 dots were produced with an electrostatic plotter, EP-2100 of Seiko Instruments & Electronics, Ltd., and the number of dot-dropouts per meter was counted.

Table 1

| Run No. | Recording density | Fog | Number of dot-dropouts per meter | Remarks |
|---|---|---|---|---|
| Example 1 | 1.05 | 0.01 | 3 | |
| Example 2 | 1.01 | 0.01 | 1 | |
| Example 3 | 1.00 | 0.01 | 10 | |
| Example 4 | 0.89 | 0.01 | 4 | |
| Example 5 | 1.12 | 0.01 | 8 | |
| Example 6 | 1.08 | 0.01 | 17 | |
| Example 7 | 1.08 | 0.01 | 3 | |
| Example 8 | 1.01 | 0.01 | 5 | |
| Example 9 | 1.07 | 0.01 | 8 | |
| Example 10 | 1.05 | 0.01 | 5 | |
| Comp. Ex. 1 | 1.04 | 0.01 | 87 | |
| Comp. Ex. 2 | 0.99 | 0.03 | 96 | |
| Comp. Ex. 3 | 0.72 | 0.01 | 18 | nonuniformity occur in solid printed areas |
| Comp. Ex. 4 | 0.78 | 0.01 | 21 | nonuniformity occur in solid printed areas |
| Comp. Ex. 5 | 0.98 | 0.01 | 32 | |

The present invention provides an electrostatic recording material that is adapted for high-speed recording at high resolution and which is capable of producing a record of high quality with a minimum number of dot-dropouts present in fine line image areas and without impairing other recording characteristics such as recording density and fog.

What is claimed is:

1. An electrostatic recording material which comprises a support coated in sequence with a conductive layer and a recording layer composed of a dielectric resin and a pigment, wherein the ratio of dielectric resin to pigment is in the range of from 5:5 to 8:2, and wherein at least 2 percent of the pigment component in said recording layer is made of an aluminum hydroxide powder having an average particle size of 1–20 μm.

2. An electrostatic recording material according to claim 1 wherein the surfaces of the particles of said aluminum hydroxide powder have been treated with an aliphatic acid or a titanium- or silane-based coupling agent.

3. An electrostatic recording material according to claim 1, wherein the average particle size of the aluminum hydroxide is larger than that of any other pigment present in the recording layer.

* * * * *